United States Patent [19]

Shaw

[11] Patent Number: 4,704,219

[45] Date of Patent: Nov. 3, 1987

[54] NOVEL COMPOSITION OF PARA-BUTYLATED AND OCTYLATED, ORTHO-ETHYLATED DIPHENYLAMINES

[75] Inventor: Chong-Kuang Shaw, Broadview Heights, Ohio

[73] Assignee: The B. F. Goodrich Company

[21] Appl. No.: 909,448

[22] Filed: Sep. 19, 1986

Related U.S. Application Data

[63] Continuation-in-part of Ser. No. 751,838, Jul. 5, 1985, abandoned.

[51] Int. Cl.$^4$ .......................................... C10M 133/12
[52] U.S. Cl. ...................................... 252/50; 564/433
[58] Field of Search ........................... 252/50; 564/433

[56] References Cited

U.S. PATENT DOCUMENTS

| 2,530,769 | 11/1950 | Hollis | 252/50 |
| 3,004,916 | 10/1961 | Ertelt | 252/50 |
| 3,505,225 | 4/1970 | Wheeler | 252/50 |
| 3,649,690 | 3/1972 | Wheeler | 564/433 |
| 3,655,559 | 4/1972 | Holt | 564/433 |
| 3,732,167 | 5/1973 | Foucher, Jr. et al. | 252/32.7 E |
| 3,758,519 | 9/1973 | Wheeler | 564/433 |
| 4,057,581 | 11/1977 | Krall et al. | 564/433 |

FOREIGN PATENT DOCUMENTS 849548  7/1984  South Africa.

*Primary Examiner*—William R. Dixon, Jr.
*Assistant Examiner*—Ellen M. McAvoy
*Attorney, Agent, or Firm*—Alan A. Csontos; George A. Kap

[57] ABSTRACT

A composition useful in organic materials subject to degradation comprising a mixture of para-butylated and octylated, ortho-ethylated diphenylamines. The composition is liquid at ambient temperature, and is particularly useful as an antioxidant for rubber and latexes and petroleum based and synthetic lubricants.

4 Claims, No Drawings

NOVEL COMPOSITION OF PARA-BUTYLATED AND OCTYLATED, ORTHO-ETHYLATED DIPHENYLAMINES

CROSS REFERENCE TO A RELATED APPLICATION

This application is a continuation-in-part of application Ser. No. 751,838 filed on July 5, 1985, now abandoned.

BACKGROUND OF THE INVENTION

This invention relates to an antioxidant composition of a mixture of para-butylated and octylated, ortho-ethylated diphenylamines, which composition is a liquid at ambient conditions and is particularly useful as an antioxidant for petroleum based and synthetic lubricants.

The role of an antioxidant is to prevent or inhibit the oxidation of organic materials such as petroleum based lubrications. Alkylated diphenylamines are known as useful antioxidants.

Some examples of alkylated diphenylamine antioxidants include 4,4'-bis (α,α-dimethylbenzyl)diphenylamine and other compounds described in U.S. Pat. No. 3,649,690; 2,2'-diethyl-4,4'-di-t-octyldiphenylamine and other compounds described in U.S. Pat. No. 3,732,167; 2,2',4,4'-tetra-t-butyldiphenylamine and other compounds described in U.S. Pat. No. 3,655,559; and p,p'-di-t-octyldiphenylamine and p,p'-di(α-phenylethyl)diphenylamine described in U.S. Pat. No. 2,530,769.

Para- and ortho-alkylated diphenylamines are typically prepared using a two-stage process such as the one described in the U.S. Pat. No. 3,655,559 patent referenced above. In the first stage, diphenylamine (DPA) is alkylated at one or both of the ortho-(2,2') positions by alkylating diphenylamine with a first olefin. The intermediate compound is then washed or isolated, and, in the second stage, the compound is para-alkylated using a second olefin.

Another process for preparing para-, ortho-alkylated diphenylamines involves a one-stage process where the ortho-alkylated intermediate product is not isolated from the reaction mix but is para-alkylated in the reaction mix to provide the final product. This one-stage process is fully described in a copending application for patent filed on Aug. 29, 1986 and entitled "Improved Process For the Preparation of Ortho-, Para-Alkylated Diphenylamines". The disclosure of this copending application is hereby incorporated by reference.

A problem with using known alkylated diphenylamines as antioxidants, particularly for lubricating fluids, is that the compounds are typically solids and not readily dispersable or soluble in the polymer or fluids. For example, a well-known para-alkylated diphenylamine, which is used as an antioxidant, is 4,4'-di-(α,α-diphenylethyl) diphenylamine (Naugard 445). This compound is a solid at ambient temperatures.

Another well-known para-, ortho-alkylated diphenylamine, which is used as an antioxidant, is 2,2'-diethyl-4,4'-di-t-octyldiphenylamine (OEPA), which is described both in the 3,655,559 and 3,732,167 patents previously referenced. The pure compound, OEPA, crystallizes at about 63° C. (145.4° F.).

An example of a para-alkylated diphenylamine which is liquid at ambient temperatures is the composition mixture described in European Patent Office application No. 0,149,422 to Ciba-Giegy AG. This composition is a specific mixture of para-octylated and para-butylated diphenylamines, wherein the 4,4'-di-t-octyldiphenylamine in the mixture must be below 30% by weight total in the mix. An example of a para-, ortho-alkylated diphenylamine which is liquid at ambient temperature is 4,4'-dinonyl-2,2'-diethyl diphenylamine (Agerite NEPA).

It is an object of the present invention to provide a novel composition comprising a mixture of para-octylated and butylated, ortho-ethylated diphenylamines, which composition is liquid at ambient temperatures, and, as such, is particularly useful as an antioxidant for petroleum based and synthetic lubricants.

SUMMARY OF THE INVENTION

The invention is a novel composition which is a liquid at ambient temperature, which substantially comprises a mixture of
2,2'-diethyldiphenylamine;
4,4'-di-t-octyl-2,2'-diethyldiphenylamine;
4-t-octyl-2,2'-diethyldiphenylamine;
4-t-butyl-2,2'-diethyldiphenylamine;
4,4'-di-t-butyl-2,2'-diethyldiphenylamine; and
4-t-butyl-4-t-octyl-2,2'-diethyldiphenylamine.

The composition is useful as an antioxidant for unsaturated rubbers and latexes and petroleum based and synthetic lubricants.

DETAILED DESCRIPTION

The present invention provides a composition which is liquid at ambient temperature substantially comprising a mixture of para-butylated and octylated, ortho-ethylated diphenylamines.

The compounds in the composition are prepared from diphenylamine (DPA), $(C_6H_5)_2NH$, which is a well-known, commercially available compound. The alkylated diphenylamines present in the composition of the invention have the following formula:

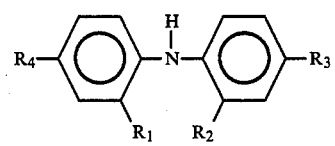

wherein $R_1$ and $R_2$ are hydrogen or ethyl groups and at least one of $R_1$ and $R_2$ is ethyl, and $R_3$ and $R_4$ are hydrogen or t-butyl or t-octyl groups and at least one of $R_3$ and $R_4$ is t-butyl or t-octyl. Preferably, both $R_1$ and $R_2$ are ethyl groups, and $R_3$ and $R_4$ are t-butyl and/or t-octyl groups.

The preferred composition of the invention substantially comprises a mixture of the following six alkylated diphenylamines:

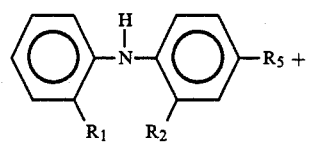

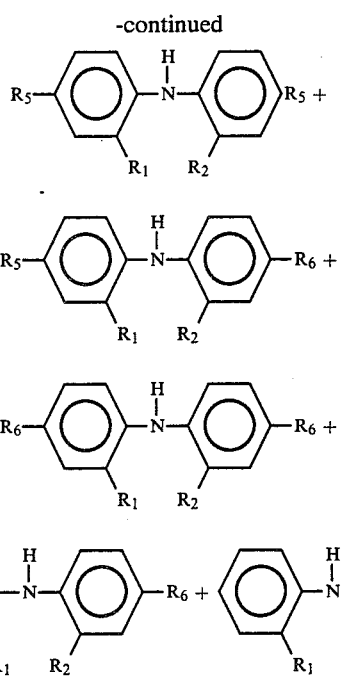

where $R_1$ and $R_2$ are ethyl groups, $R_5$ is t-butyl and $R_6$ is t-octyl.

The composition of this invention is readily prepared by using the one-stage process for alkylation of diphenylamines which comprises (1) forming an aluminum complex by the reaction of diphenylamine with aluminum; (2) ortho-alkylating diphenlamine with ethylene in the presence of an aluminum complex as a catalyst to form an ortho-ethylated diphenylamine intermediate; (3) adding a hydrogen halide to the ortho-ethylated intermediate; and (4) subsequently para-alkylating the ortho-ethylated diphenylamine intermediate with diisobutylene in the presence of a Friedel-Crafts aluminum catalyst at a temperature of about 160° C. to about 220° C.

In the one-stage process, the ortho-ethylation of the diphenylamine is carried out in a closed reaction vessel by mixing the ethylene and diphenylamine at a proportion of ethylene from about 2.0 to about 2.5 moles per mole of diphenylamine. The catalyst used in the ortho-ethylation is an aluminum complex formed by the reaction of diphenylamine with aluminum metal or a combination of aluminum trichloride with an alkali metal, such as sodium metal.

The ortho-ethylation reaction may be carried out at atmospheric pressure but is typically conducted at superatmospheric pressures up to 400 atmospheres. The process of the reaction may be conveniently followed by observing the drop in pressure as the gaseous ethylene is consumed.

It has been found that when diphenylamine is reacted with ethylene to form 2,2'-diethyldiphenylamine, there is also found minor amounts of 2-ethyldiphenylamine and 2,2',6-triethyldiphenylamine. These compounds are present in minor amounts (below 5% by weight).

Subsequent to the ortho-alkylation step, the intermediate ortho-ethylated products are treated with hydrogen halides either as a gas, an amine salt thereof or other suitable anhydrous salts thereof. Suitable hydrogen halides include hydrogen chloride, hydrogen bromide, hydrogen iodide, aniline hydrochloride and diphenylamine hydrochloride. The most preferred hydrogen halide is hydrogen chloride and salts thereof because of their ease of storage and use.

The amount of hydrogen halides used is in approximately a 3:1 molar ratio of hydrogen halides to the aluminum complex used in the ortho-ethylation step. Higher levels of hydrogen halides may be used without adverse effects.

The treatment of the ortho-ethylated intermediate with hydrogen halides leads to generation of a Friedel-Crafts aluminum catalyst which is used in the para-alkylation step. The generation of the Friedel-Crafts catalyst with hydrogen chloride is believed to follow a mechanism as set forth below:

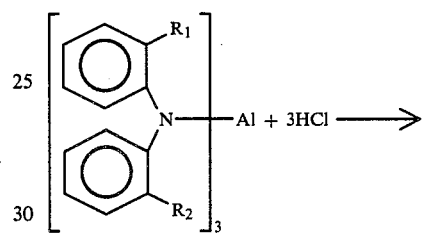

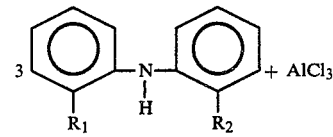

Following the generation of the Friedel-Crafts catalyst, the para-alkylation of the ortho-ethylated diphenylamine is carried out. In the para-alkylation step, the ortho-ethylated intermediate is reacted with diisobutylene. This step is conveniently effected by charging the diisobutylene into a reactor and conducting the reaction at a temperature in the range of about 160° C. to about 220° C., and preferably in the range of about 170° C. to about 200° C. The reaction Pressure is typically in the range of about 20 psig to about 60 psig.

It is believed that at temperatures exceeding 150° C., in the presence of a Friedel-Crafts catalyst, diisobutylene exists in equilibrium as shown in the following structures:

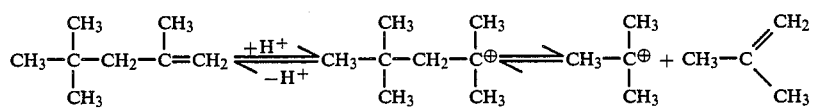

The equilibrium of the isobutylene and diisobutylene provides the basis to form the composition of the invention, which is a mixture of para-butylated and octylated, ortho-ethylated diphenylamines.

The composition of the invention is substantially a mixture of the following major products:
2,2'-diethyl-diphenylamine;
4-t-octyl-2,2'-diethyldiphenylamine;
4,4'-di-t-octyl 2,2'-diethyldiphenylamine;
4-t-butyl-4'-t-octyl-2,2'-diethyldiphenlamine;

4,4'-di-t-butyl-2,2'-diethyldiphenylamine; and
4-t-butyl-2,2'-diethyldiphenylamine.

However, also found in the mixture are minor amounts of 4-t-octyl-2,2',6'-triethyldiphenylamine and 4,4'-di-t-octyl-2-ethyldiphenylamine, and trace amounts of 4,4'-di-t-octyl-2,2'6'-triethyldiphenylamine.

The products derived from the para-alkylation reaction are somewhat time dependent. At first the diisobutylene alkylates the diphenylamine at the para-positions. Since Friedel-Crafts reactions are reversible, the diisobutylene can dealkylate at the para-position and be replaced by isobutylene, which yields the para-t-butylated compounds. The para-butylated compounds are more stable than the para-octylated compounds, and, hence, their presence increases with time. For example, during the first hour of reaction at 190° C., the initial para-alkylation products are predominantly 4,4'-di-t-octyl-2,2'-diethyldiphenylamine and 4-t-octyl-2,2'-diethyldiphenylamine. Since the 4,4'-di-t-octylated compound has a melting point of about 63° C. it is desirable to reduce the amount of this product in the final mix to below about 50 percent by weight of the total composition. After about two hours at 190° C., the amount of the 4,4'-di-t-octylated compound decreases, and the amount of the 4-t-butylated-4'-t-octylated and 4,4'-di-t-butylated compounds increase. After about four hours, the composition of products remains relatively stable.

On completion of the para-alkylation reaction the composition can be isolated from the final reaction mixture using any conventional technique. For instance, the unreacted diisobutylene may be vented, the reaction mixture washed with a mild caustic solution to remove the catalyst, and the crude product purified by vacuum fractionation.

The temperature at which the composition of the invention solidifies is less than 0° C. This physical feature of the composition was an unexpected and advantageous result. The low temperature decreases the difficulties in handling the composition during production and subsequent operations.

The composition of the invention can be used as an antioxident for organic materials in an amount from about 0.01 percent to about 10.0 percent or more by weight of the composition based on the weight of organic material. More preferably, the organic materials contain from about 0.1 percent to about 5.0 percent by weight of the composition based on the weight of the organic material. The exact amount of the composition employed in any particular organic material will vary depending on the nature of the organic material and on the severity of the external conditions under which the material is to be used.

A class of organic materials for which the compositions of the present invention find use as antioxidants are unsaturated rubbers such as natural rubber, SBR rubbers, polyisopiene rubbers, butadiene rubbers, and the like; and latexes such as butadiene latexes, SB latexes, and the like. A particular organic material for which the composition of the invention is a very useful antioxidant are petroleum based and synthetic lubricants. The composition, being liquid, mixes in and readily disperses in these lubricants and provides excellent oxidative protection.

The following Examples are shown to illustrate the invention and are not to be construed as restricting or limiting the scope of the invention.

EXAMPLE 1

200 grams of diphenylamine, 3.78 grams of aluminum trichloride and 1.9 grams of sodium were added to a dry 500 ml 3-neck round-bottom flask. The mixture was warmed to 130° C. and maintained for 2 hours at 140° C., after which time no further evolution of hydrogen was noticed. The mixture was then transferred into a stainless steel autoclave and sealed. After evacuation, the autoclave was pressurized with ethylene and heated to 200° C. The ethylene pressure was maintained at 50 psig for 6 hours. The reaction mixture was then cooled to room temperature and treated with 3.1 grams of hydrogen chloride gas. 241 grams of diisobutylene was added, and the reaction mixture heated to 190° C. and maintained at that temperature for about 4 hours. The unreacted diisobutylene was vented and a liquid product, wt. 247 grams, was collected, and washed with a dilute caustic solution to remove the catalyst. The composition, which was a liquid at room temperature, was purified by a vacuum fractionation to remove low boiling components such as unreacted diisobutylene. High performance liquid chromatographic (HPLC) analysis showed the final composition to be comprised of (weight percent) 10.3% of 2,2'-diethyldiphenylamine, 16.4% of 4-t-butyl-2,2'-diethyldiphenylamine, 8.8% of 4,4'-di't'butyl-2,2'-diethyldiphenylamine, 25.2% of 4-t-octyl-2,2'-diethyldiphenylamine, 19.5% of 4-t-butyl-4'-t-octyl-2,2'-diethyldiphenylamine, and 13.3% of 4,4'-di-t-octyl-2,2'-diethyldiphenylamine.

EXAMPLE 2

An 845 ml capacity autoclave was charged with 225 grams of 2,2'-diethyldiphenylamine prepared as above, 179 grams of diisobutylene and 5 grams of aluminum trichloride. The reaction mixture was heated to 190° C. for about 2 hours. The crude product was washed with 200 ml of water, 200 ml of 1% NaOH, and again with 200 ml of water. HPLC analysis showed the composition to be comprised of (weight percent) 6.4% of 2,2'-diethyldiphenylamine, 12.8% of 4-t-butyl-2,2'-diethyldiphenylamine, 20.6% of 4-t-octyl-2,2'-diethyldiphenylamine, 8.0% of 4,4'-di-t-butyl-2,2'-diethyldiphenylamine, 24.9% of 4-t-butyl-4'-t-octyl-2,2'-diethyldiphenylamine, and 19.6% of 4,4'-di-t-octyl-2,2'-diethyldiphenylamine.

EXAMPLE 3

In an oxidation test, 0.35 Wt % of the composition prepared in Example 1 was added to an engine oil and tested at 160° C. and an oxygen pressure of 90 psi (using a metal catalyst) according to a procedure similar to the rotary bomb test of ASTM D-2272. The test results showed that the engine oil containing the composition of the invention which was prepared in Example 1 performed better and lasted longer (95 minutes) than the same engine oil containing a well-known antioxidant, OEPA (4,4'-di-t-octyl-2,2'-diethyl diphenylamine), which lasted 80 minutes in the test. The engine oil containing the composition of the invention also Performed better than the same engine oil containing another well-known antioxidant, 4,4'-dinonyldiphenylamine (which is a liquid at ambient temperatures), which lasted only 77 minutes in this test.

I claim:

1. A composition, liquid at ambient temperature, consisting essentially of a mixture of 2,2'-diethyl diphenylamine; 4,4'-di-t-octyl-2,2'-diethyldiphenylamine;

4,4'-di-t-butyl-2,2'-diethyldiphenylamine; 4-t-butyl-4'-t-octyl-2,2'-diethyldiphenylamine; 4-t-butyl-2,2'-diethyldiphenylamine; and 4-t-octyl-2,2'-diethyldiphenylamine.

2. A composition comprising an organic material susceptible to oxidative deterioration and from about 0.01% to about 10% by weight based upon the weight of the organic material of a composition of claim 1.

3. Composition of claim 2 wherein said organic material is a petroleum based or synthetic lubricant.

4. A composition, liquid at ambient temperature, consisting of a mixture of para-butylated and octylated, ortho-ethylated diphenylamines prepared by (1) the first reaction of diphenyleneamine with ethylene in the presence of an aluminum complex, (2) adding hydrogen halide to the intermediate product from the first reaction, (3) the reaction of the intermediate product from the first reaction with diisobutylene in the presence of a Friedel-Crafts catalyst at a temperature of about 160° C. to about 220° C., and (4) recovering the final product.

* * * * *